June 12, 1945. T. K. RIGGEN 2,378,327
DYNAMIC FUSE TESTING DEVICE
Filed Sept. 9, 1941 2 Sheets-Sheet 1
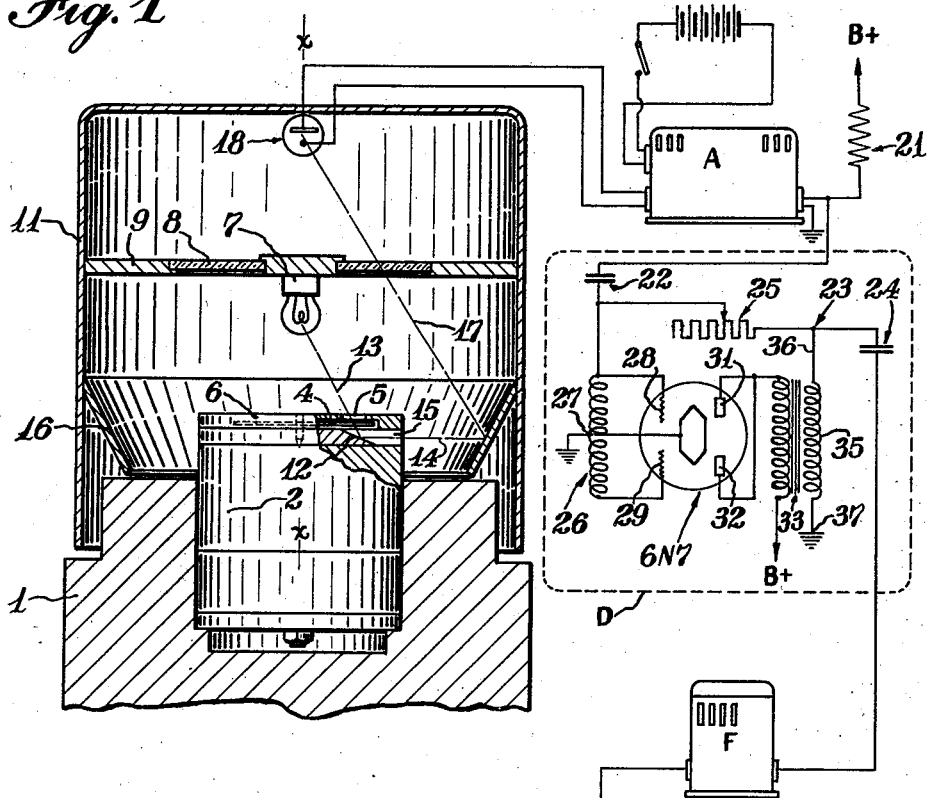
Fig. 1
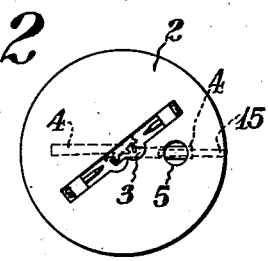
Fig. 2
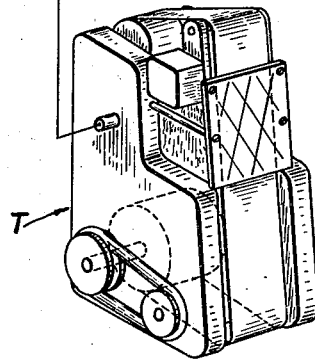
Witness:
Burr W. Jones
INVENTOR.
BY Theodore K. Riggen
Clinton S. Janes
ATTORNEY June 12, 1945.  T. K. RIGGEN  2,378,327
DYNAMIC FUSE TESTING DEVICE
Filed Sept. 9, 1941  2 Sheets-Sheet 2
*Fig. 3*
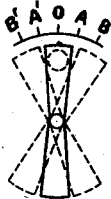
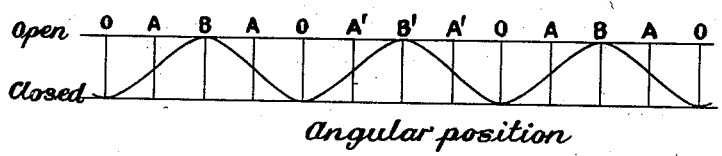
*Fig. 4*
*Fig. 5*
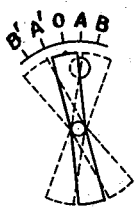
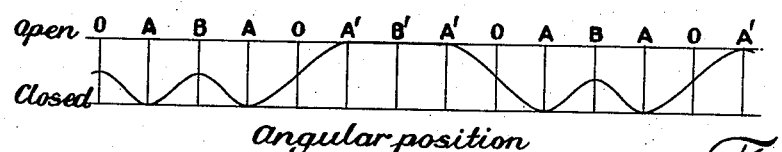
*Fig. 6*
*Fig. 7*
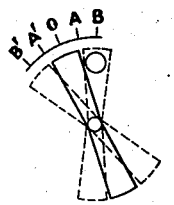
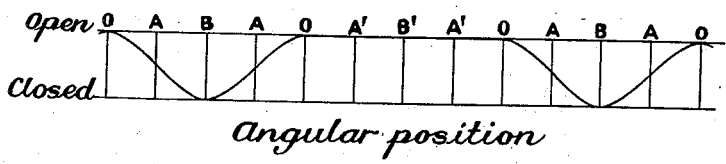
*Fig. 8*
Witness:
Burr W. Jones
INVENTOR.
Theodore K. Riggen
BY Clinton S. Janes
ATTORNEY

Patented June 12, 1945

2,378,327

UNITED STATES PATENT OFFICE 2,378,327

DYNAMIC FUSE TESTING DEVICE

Theodore K. Riggen, Elmira, N. Y., assignor to Bendix Aviation Corporation, South Bend, Ind., a corporation of Delaware Application September 9, 1941, Serial No. 410,159

11 Claims. (Cl. 73—5)

The present invention relates to a dynamic fuse testing device and more particularly to a device for checking the accuracy of the chronometric mechanism of a mechanical time fuse for explosive projectiles, while the fuse is being rotated to simulate flight conditions.

In applicant's prior Patent No. 2,236,719 a chronographic apparatus is disclosed comprising means for illuminating the vibrating pallet of a fuse through an opening therein while the fuse is being rotated, means for projecting the light reflected from the pallet on a photo-electric cell, amplifying and filtering means for the electrical oscillations so caused, and a printing machine controlled by the out-put of the amplifier.

Devices of this character have been found to operate satisfactorily when the pallet is so adjusted as to vibrate approximately symmetrically across the illuminated opening, but if the pallet is so positioned that it swings considerably further on one side of the opening than the other, both fundamental and harmonic oscillations are produced, and the testing device may become unreliable or even inoperative.

It is an object of the present invention to provide a novel fuse testing device which is efficient and reliable in operation under all service conditions.

It is another object to provide such a device which is arranged to record the frequency of vibration of a chronometric element irrespective of variations in angular adjustment of the element.

It is another object to provide a novel method and means for selectively amplifying electrical oscillations without amplifying strays or background noise.

It is another object to provide a novel method of filtering out undesired oscillations from a fundamental oscillation and/or its harmonic oscillations.

It is a further object to provide a novel device for carrying out said method which is continuously and substantially uniformly effective irrespective of substantial variations in the frequency and/or the relative amplitude of the fundamental and its harmonic oscillations.

It is another object to provide such a device which integrates the energy of the fundamental and harmonic vibrations.

It is another object to provide such a device which may be arranged to provide a substantially constant out-put irrespective of variations in the relative amplitude of the fundamental and harmonic oscillations, or may if desired emphasize either component at the expense of the other to any desired degree.

Further objects and advantages will be apparent from the following description taken in connection with the accompanying drawings, in which:

Fig. 1 is a semi-diagrammatic illustration of a fuse testing system incorporating the present invention;

Fig. 2 is a plan view of a fuse to be tested as viewed from above in Fig. 1;

Fig. 3 is a diagram showing various operative positions of a vibrating pallet in respect to a light-transmitting opening;

Fig. 4 is a graph illustrating the transmission of light through said opening during the vibration of the pallet across said opening;

Fig. 5 is a view similar to Fig. 3 showing the pallet arranged to vibrate un-symmetrically with respect to the opening;

Fig. 6 is a graph showing the transmission of light through the opening as controlled by vibration of the pallet in Fig. 5;

Fig. 7 is a view similar to Fig. 3 showing the pallet so arranged that it covers the opening only at one end of its vibratory motion; and Fig. 8 is a graph showing the transmission of light through the opening as controlled by the pallet in Fig. 7.

In Fig. 1 of the drawings there is illustrated a chuck member 1 adapted to receive a fuse 2 to be tested, the chuck being rotatable about the axis of the fuse by any suitable means not illustrated. The fuse is provided with a chronometric train of gearing not illustrated, terminating in a vibrating pallet 3 which is pivoted substantially on the axis of the fuse and has a blade 4 located beneath an opening 5 in the end wall 6 of the fuse.

Means for constantly illuminating the opening 5 is provided in the form of a suitable lamp 7 mounted centrally in a circular plate of glass 8 which is supported by a partition 9 fixed in a light-tight housing member 11 removably mounted coaxial with the fuse.

The fuse 2 is provided with a polished reflecting surface 12 arranged at such an angle to the axis of the fuse that the beam of light 13 from the lamp 7 which traverses the opening 5 is reflected radially thereby as indicated at 14, so as to emerge from the fuse through a radial opening 15 therein. A reflector 16 formed as a frustrum of a cone is fixed coaxially in the housing 11 in position to receive the emergent beam of light 14 and reflect it upwardly and toward the axis of rotation x—x of the fuse as shown at 17, irrespective of the rotation of the fuse.

A photo-electric cell 18 is mounted in the upper portion of the housing 11 on the axis x—x with its sensitive element at the point where the beam 17 crosses said axis, so that the beam is continuously focused on said cell. The modulation of the light beam caused by the vibration of the blade 4 of the pallet 3 across the opening 5 causes the photo-electric cell 18 to generate electrical oscillations which are stepped up by an amplifier A of any suitable form and then conducted through a band-pass filter to a timing mechanism T. It will be understood that the filter is arranged to reject all electrical oscillations except those synchronized with the vibration of the pallet, and the timer operated thereby may be of any preferred form and forms no part of the present invention.

As above stated, difficulty is sometimes encountered in the operation of a system of this character when the pallet is unsymmetrically arranged with respect to the light transmitting opening 5 of the fuse. This condition is best explained by reference to Figs. 3 to 8 inclusive. In Fig. 3 the condition is illustrated in which the pallet is so arranged that the opening 5 is covered when the pallet is in the center of its swinging movement. The occultation of the light beam by the vibration of the pallet is indicated by the graph in Fig. 4 which shows a curve having a frequency which is double the frequency of vibration of the pallet, or in other words, the second harmonic of the pallet frequency. This is the condition which has been heretofore considered the optimum, and the filter has been designed to pass said frequency.

It frequently happens, however, that the swing of the pallet is not symmetrical with respect to the opening 5. In Fig. 7 the condition is illustrated in which a pallet is so adjusted that it covers the opening 5 only at one end of its swinging movement. The light transmitted through the opening 5 then corresponds to the curve set forth in Fig. 8, which curve shows a periodic fluctuation having the same frequency as the vibration of the pallet. Obviously if the filter F is designed to pass the harmonic frequency illustrated in Fig. 4 it will reject the fundamental frequency illustrated in Fig. 8, and the device is incapable of testing fuses in which the pallet is located as in Fig. 7.

In practice, the adjustment of the pallet will commonly be somewhere between the positions illustrated in Figs. 3 and 7, and Fig. 5 illustrates such an intermediate position in which the opening 5 is half covered by the pallet when it is at the center of its swing. The resultant modulation of the light beam is shown by the curve in Fig. 6 which shows the presence of both the fundamental and the second harmonic frequencies. In such cases if the harmonic component is of sufficient amplitude the device may operate satisfactorily, but as the component becomes less predominant, it becomes increasingly difficult to secure reliable operation.

According to the present invention a method and means are provided for so integrating the harmonic and fundamental components as to secure a reliably effective resultant irrespective of variations in the relative amplitude of the component frequencies. Moreover, when both frequencies are present, this additive effect is utilized to produce a selective amplification of the desired oscillations without amplifying any other electrical oscillations which may be imposed on said frequencies.

As shown in Fig. 1 this result is accomplished by means of a partial doubling device indicated generally at D interposed between the amplifier A and filter F. The amplifier is coupled to the doubler in any suitable manner as by means of a resistance coupling comprising a resistor 21 in the plate supply for the amplifier and a fixed coupling condenser 22 of suitable capacity. From the condenser 22 two parallel paths are provided which are joined at 23 and connected through a coupling condenser 24 to the filter F. One path is provided by a variable resistor 25 which is non-inductive and therefore passes all frequencies without discrimination. The second path includes a frequency doubling device which as here shown comprises a suitable inductance 26 having a grounded center tap 27 and connected at its ends to the grids 28, 29 of a twin triode vacuum tube such for instance as that commercially designated 6N7. The plates 31, 32 of the tube are connected in parallel through the primary of an out-put transformer to the plate supply, one end of the secondary 35 being connected by a lead 36 to the junction point 23, and the other end being grounded at 37.

The operation of this arrangement is as follows: The oscillations engendered by the photo-electric cell 18 and amplified by the amplifier A comprise mainly the fundamental and harmonic frequencies from the vibration of the pallet, and oscillations having the frequency of the rotation of the fuse in the chuck, caused by stray reflections from the surface of the fuse, etc. If the fundamental frequency is indicated by the letter F, the harmonic frequency by the symbol $F_2$, and the oscillation having the frequency of the rotation of the fuse by $F_r$, the out-put of the amplifier may be expressed as follows:

$$F + F_2 + F_r$$

When this out-put passes through the partial doubler D, part thereof goes through the resistor 25 and the remainder goes through the doubler comprising the inductance 26. If the resistor 25 is adjusted to transmit half the load, the part transmitted by each branch circuit may be expressed as follows:

$$\frac{F}{2} + \frac{F_2}{2} + \frac{F_r}{2}$$

The part of the load which traverses the doubler, when it emerges therefrom, is of twice the original frequency so that it becomes.

$$\frac{F_2}{2} + \frac{F_4}{2} + \frac{F_{2r}}{2}$$

When the components of the two branch circuits are brought together at 23, the addition thereof takes place as follows:

$$\frac{F}{2} + \frac{F_2}{2} + \frac{F_r}{2}$$

$$\frac{F_2}{2} + \phantom{x} \frac{F_4}{2} + \frac{F_{2r}}{2}$$

$$\overline{\frac{F}{2} + F_2 + \frac{F_r}{2} + \frac{F_4}{2} + \frac{F_{2r}}{2}}$$

The effect of applicant's partial doubler is therefore seen to be equivalent to a selective amplification by a mu of two, of the frequency $F_2$ without amplifying any other frequency, and since the emergent frequency $F_2$ is derived from both the original frequencies F and $F_2$, the emergent frequency F₂ is produced reliably irrespective of the relative amplitude of the original fundamental and harmonic oscillations and irrespective of variations in the actual frequency thereof. Actually, in this case this effect is obtained by the attenuation of the undesired frequencies rather than by the amplification of the desired frequency F₂, but obviously the result is equivalent to a selective amplification. Since the filter F is designed to pass a frequency F₂, the device is effective to operate the timer T whether the pallet 3 is adjusted as shown in Fig. 3 or as shown in Fig. 7, or in any intermediate position such as indicated in Fig. 5.

By virtue of the adjustability of the resistor 25, the greatest advantage may be taken of this arrangement in connection with any desired form of doubling arrangement. Thus, if the doubler is arranged to amplify the signals passing therethrough, the resistor is preferably arranged to so proportion the power input between the branch circuits as to substantially equalize the out-puts thereof. For instance, if the amplification factor of the doubler is 3, the resistor may be adjusted to allow three-fourths of the input to pass therethrough and cause one-fourth to pass through the doubler. The formulae of operation of the partial doubler is then as follows:

$$\frac{3F}{4} + \frac{3F_2}{4} + \frac{3F_r}{4}$$

$$\frac{3\left(\frac{F_2}{4} + \frac{F_4}{4} + \frac{F_{2r}}{4}\right)}{\frac{3F}{4} + \frac{3F_2}{2} + \frac{3F_r}{4} + \frac{3F_4}{4} + \frac{3F_{2r}}{4}}$$

The integration of the fundamental and harmonic oscillations thus results in a selective amplification of the desired frequency F₂ in the order of 100%, as in the first instance.

Although but one embodiment of the invention has been shown and described in detail it will be understood that other embodiments are possible and that variations in the design and arrangement of the parts may be made without departing from the spirit of the invention as defined in the claims appended hereto.

What is claimed is:

1. In a testing device for a time fuse having a vibrating chronometric member, means controlled by the chronometric member of the fuse under test for generating electrical oscillations said oscillations including a fundamental frequency corresponding to the frequency of vibration of said member and/or a harmonic thereof depending upon the condition of the fuse being tested, a band-pass filter designed to pass a harmonic of the frequency of vibration of said member, a timing device, means conducting a part of said electrical energy through the filter to the timing device, and means for multiplying the frequency of another part of said energy by the factor of the harmonic, and then conducting it through the filter to the timing device.

2. In a dynamic testing device for a time fuse having a vibrating chronometric element, means for rotating the fuse while operating the chronometric element, means for directing a beam of light on the vibrating element, means for directing that portion of the beam which is not intercepted by said element onto a photo-electric cell, means for amplifying the electrical oscillations so generated by the cell, alternative branch circuits for the out-put of the amplifying means, one of said branches comprising a frequency doubler, a band-pass filter connected to both branches arranged to reject all frequencies except the second harmonic of the frequency of vibration of the chronometric element, and a recording device controlled by the out-put from the filter.

3. In combination with means for generating electrical oscillations including a fundamental and a second harmonic component, a filter arranged to pass only the harmonic frequency, and parallel coupling means between the oscillator and filter, one of said coupling means including a frequency doubling device.

4. A method of isolating and integrating two continuous electrical oscillations having harmonic relation, comprising the steps of dividing the energy of the oscillations into two parts, multiplying the frequency of the oscillations in one part by the factor of the harmonic, combining the oscillations of multiplied frequency with the other said part, and filtering out all oscillations except said harmonic frequency.

5. A method of selectively amplifying two harmonic electrical oscillations including the steps of dividing the energy of the oscillations into two parts, multiplying the frequency of the oscillations in one part by the factor of the harmonic while controlling the relative amount of energy in each part to substantially equalize the same, combining the parts and filtering out all oscillations except the harmonic frequency.

6. In combination, a photo-electric cell, means for directing a beam of light thereon, a chronometric device including a vibrating member so arranged as to intercept said beam to an extent which is varied by the oscillation of the member, means controlled by said cell for producing electrical oscillations corresponding to the modulation of the light beam by said member, means providing two parallel paths for said oscillatory currents, means for doubling the frequency of the oscillations traversing one of said paths, means for combining the output of said two paths, and filtering out all oscillations except those corresponding to the second harmonic of the frequency of vibration of said member, and means for measuring the frequency of said filtered output.

7. In the combination set forth in claim 6, means for controlling the relative amounts of electrical energy traversing said two parallel paths.

8. In a testing device for a time fuse having a vibrating chronometric member, means controlled by the chronometric member of the fuse under test for generating electrical oscillations, said oscillations including a fundamental frequency corresponding to the frequency of vibration of said member and/or a harmonic thereof depending upon the condition of the fuse being tested, a band pass filter designed to pass said harmonic frequency, a timing device responsive to said harmonic frequency, means for transmitting a portion of said electrical energy through said filter to said timing device and means for multiplying the frequency of another portion of said electrical energy by the factor of the harmonic and then transmitting it through said filter to said timing device.

9. In a dynamic tester for a time fuse having a vibratory chronometric element, means for modulating a beam of light by the vibration of the chronometric element of a fuse under test, so arranged that said modulation comprises a fundamental and/or the second harmonic depending upon the condition of the fuse being tested, photo-electric means for generating electrical oscillations corresponding to the modulation of the light beam, means for doubling the frequency of a part of the energy of said electrical oscillations, means for combining said doubled frequencies with the original frequencies to provide an output in which said second harmonic is always present, means for filtering out all but said harmonic frequency from said output, and indicating means actuated by said filtered output.

10. In combination a source of electrical oscillations comprising a fundamental and a second harmonic thereof so phased that alternate peaks of the harmonic coincide with similar peaks of the fundamental, means dividing the output of said source, means for doubling the frequency of one part of the output and then combining said part with the remainder of said output, in such phase relation that the oscillations of the harmonic frequency in both parts are in phase, and chronometric indicating means actuated by said combined oscillations of harmonic frequency.

11. An electrical chronometric indicator as set forth in claim 10 including further, means for filtering out from said combined output all oscillations except those of the harmonic frequency.

THEODORE K. RIGGEN.